US009721071B2

(12) United States Patent
Chan et al.

(10) Patent No.: US 9,721,071 B2
(45) Date of Patent: Aug. 1, 2017

(54) BINDING OF CRYPTOGRAPHIC CONTENT USING UNIQUE DEVICE CHARACTERISTICS WITH SERVER HEURISTICS

(75) Inventors: Francis Yee-Dug Chan, San Diego, CA (US); Eric William Grab, San Diego, CA (US); Michael George Kiefer, Lake Havasu City, AZ (US)

(73) Assignee: Sonic IP, Inc., San Diego, CA (US)

( * ) Notice: Subject to any disclaimer, the term of this patent is extended or adjusted under 35 U.S.C. 154(b) by 141 days.

(21) Appl. No.: 13/339,315

(22) Filed: Dec. 28, 2011

(65) Prior Publication Data

US 2013/0007467 A1    Jan. 3, 2013

Related U.S. Application Data

(60) Provisional application No. 61/502,705, filed on Jun. 29, 2011.

(51) Int. Cl.
*G06F 12/14* (2006.01)
*G06F 21/10* (2013.01)

(52) U.S. Cl.
CPC ...... *G06F 21/10* (2013.01); *G06F 2221/0704* (2013.01)

(58) Field of Classification Search
CPC ......... G06F 21/00; G06F 21/10; G06F 21/121
USPC ........................................................ 713/189
See application file for complete search history.

(56) References Cited

U.S. PATENT DOCUMENTS

| 6,675,174 | B1* | 1/2004 | Bolle ............... G06F 17/30802 |
| 7,231,450 | B1* | 6/2007 | Clifford .................. G06F 21/10 709/202 |
| 7,412,053 | B1* | 8/2008 | Lyle ..................... H04L 9/0844 324/750.3 |
| 7,492,763 | B1* | 2/2009 | Alexander, Jr. ..... H04L 12/4645 370/389 |
| 7,526,085 | B1* | 4/2009 | Bong .................... H04L 63/061 380/37 |

(Continued)

FOREIGN PATENT DOCUMENTS

WO    2013002833 A2    1/2013

OTHER PUBLICATIONS

International Search Report and Written Opinion for International Application PCT/US2011/67774; mailed Apr. 9, 2012, 7 pgs.

*Primary Examiner* — Krista Zele
*Assistant Examiner* — Tariq Najee-Ullah
(74) *Attorney, Agent, or Firm* — KPPB LLP

(57) ABSTRACT

Systems and methods for binding of cryptographic content using unique device characteristics with server heuristics in accordance with embodiments of the invention are disclosed. One embodiment includes a processor and memory includes collecting a combination of device characteristics that uniquely identify the device using information stored on the device and accessible to the device using the device processor, generating device match data based upon the collected combination of device characteristics using the device processor, generating a device protection key using the device match data, encrypting the cryptographic data using the device protection key, and storing the encrypted cryptographic data in device memory using the device processor.

26 Claims, 9 Drawing Sheets

(56) References Cited

U.S. PATENT DOCUMENTS

| | | | |
|---|---|---|---|
| 8,307,395 B2* | 11/2012 | Issa | G06F 17/30817 709/219 |
| 8,401,188 B1* | 3/2013 | Swaminathan | G06F 21/10 380/200 |
| 8,918,636 B2* | 12/2014 | Kiefer | H04L 9/0819 713/150 |
| 2005/0144468 A1* | 6/2005 | Northcutt | G06F 21/10 713/189 |
| 2006/0020825 A1* | 1/2006 | Grab | G06F 21/10 713/193 |
| 2006/0083369 A1 | 4/2006 | Lee | |
| 2006/0137015 A1* | 6/2006 | Fahrny et al. | 726/26 |
| 2007/0033419 A1* | 2/2007 | Kocher et al. | 713/193 |
| 2007/0100701 A1* | 5/2007 | Boccon-Gibod et al. | 705/21 |
| 2007/0220279 A1* | 9/2007 | Northcutt | H04L 25/03159 713/193 |
| 2008/0046718 A1* | 2/2008 | Grab | G06F 21/10 713/156 |
| 2008/0082813 A1* | 4/2008 | Chow | G06F 21/34 713/2 |
| 2009/0138948 A1* | 5/2009 | Calamera et al. | 726/6 |
| 2009/0248886 A1* | 10/2009 | Tan | H04L 12/1836 709/231 |
| 2009/0265737 A1* | 10/2009 | Issa | G06F 17/30817 725/38 |
| 2010/0058072 A1* | 3/2010 | Teow et al. | 713/193 |
| 2011/0145562 A1* | 6/2011 | Mangalore | H04L 63/0464 713/151 |
| 2011/0222687 A1* | 9/2011 | Mori | H04N 7/1675 380/200 |
| 2011/0252243 A1* | 10/2011 | Brouwer | H04L 9/0838 713/189 |
| 2013/0124859 A1* | 5/2013 | Pestoni | H04L 9/0825 713/163 |

* cited by examiner

BINDING OF CRYPTOGRAPHIC CONTENT USING UNIQUE DEVICE CHARACTERISTICS WITH SERVER HEURISTICS

CROSS-REFERENCE TO RELATED APPLICATIONS

The current application claims priority to Provisional. Application No. 61/502,705, filed Jun. 29, 2011, the disclosure of which is incorporated herein by reference in its entirety.

FIELD OF THE INVENTION

The present invention relates generally to managing rights to playback of media content by a player, and more specifically to systems and methods for reliably identifying a playback device and protecting digital rights management (DRM) information stored on a playback device from tampering.

BACKGROUND OF THE INVENTION

Many consumer electronics devices are equipped to play digital video and audio content from various sources and include a range of computing power. A variety of digital rights management (DRM) systems exist to prevent copying of protected content and facilitate authorized use by consumers on their devices. DRM systems typically restrict content to certain devices and/or certain users using different authentication methods or encryption of content. Many DRM systems rely on the encryption of part or the whole of content files. The encryption keys necessary to encrypt and/or decrypt content can be considered "shared secrets" known to the content provider (such as a digital video content server) or a system performing encryption for the content provider (such as a third-party trusted system) and to the content receiver (such as a playback device). Often combinations of keys are used together to protect content to facilitate encryption of content and issuance of content to a specific user and/or user device.

SUMMARY OF THE INVENTION

Systems and methods for binding of cryptographic content using unique device characteristics with server heuristics in accordance with embodiments of the invention are disclosed. One embodiment includes collecting a combination of device characteristics that uniquely identify the device using information stored on the device and accessible to the device using the device processor, generating device match data based upon the collected combination of device characteristics using the device processor, generating a device protection key using the device match data, encrypting the cryptographic data using the device protection key, and storing the encrypted cryptographic data in device memory using the device processor.

In a further embodiment, the combination of device characteristics is different for different categories of device.

In another embodiment, generating device match data based upon the collected combination of device characteristics using the device processor includes generating device match data using at least one cryptographic hash function to produce device match data having a predetermined length.

A still further embodiment also includes registering the device with a registration server.

In still another embodiment, registering the device with a registration server also includes the device sending the device match data to the registration server, the server associating the device match data with a user account, and the server sending the cryptographic data to the device.

In a yet further embodiment, the cryptographic data is associated with the user account.

In yet another embodiment, registering the device with a registration server also includes the device sending product provisioning characteristics to the registration server.

In a further embodiment again, the registration server generates the device protection key using the device match data, and encrypts the cryptographic data using the device protection key.

In another embodiment again, the device processor generates the device protection key using the device match data, and encrypts the cryptographic data using the device protection key.

In a further additional embodiment, encrypting the cryptographic data using the device protection key also includes encrypting the cryptographic data using a provisioned encryption key and encrypting the provisioned encryption key using the device protection key.

Another additional embodiment also includes accessing content using the cryptographic data.

In a still yet further embodiment, accessing content encrypted using the cryptographic data also includes collecting the combination of device characteristics that uniquely identify the device using information stored on the device and accessible to the device using the device processor, generating device match data based upon the collected combination of device characteristics using the device processor, generating a device protection key using the device processor and the device match data, accessing the encrypted cryptographic data using the device processor and the device protection key, and accessing the content using the device processor and the cryptographic data.

Still yet another embodiment also includes validating the identity of the device.

In a still further embodiment again, validating the identity of the device also includes collecting the combination of device characteristics that uniquely identify the device using information stored on the device and accessible to the device using the device processor, generating device match data based upon the collected combination of device characteristics using the device processor, and comparing the generated device match data to stored device match data associated with the device.

In still another embodiment again, comparing the generated device match data to stored device match data associated with the device also includes generating a token using the generated device match data and comparing the token to a stored token.

In a still further additional embodiment, a server compares the generated device match data to stored device match associated with the device.

In still another additional embodiment, the device processor compares the generated device match data to stored device match data.

In a yet further embodiment again, a device includes a processor and memory, and the processor is configured by a client application to collect a combination of device characteristics that uniquely identify a device using information stored on the device and accessible to the processor, generate device match data based upon the collected combination of device characteristics, generate a device protection key using the device match data, encrypt cryptographic data using the device protection key, and store the encrypted cryptographic data in memory.

In yet another embodiment again, the combination of device characteristics is different to the combination of device characteristics utilized to generate device match data on another category of device.

In a yet further additional embodiment, the client application configures the processor to generate device match data based upon the collected combination of device characteristics using at least one cryptographic hash function that produces device match data having a predetermined length.

In yet another additional embodiment, the client application also configures the processor to register the device with a registration server.

In a further additional embodiment again, registering the device with a registration server also includes the client application configuring the processor to send the device match data to a registration server.

In another additional embodiment again, registering the device with a registration server also includes the client application configuring the processor to send product provisioning characteristics to the registration server.

In a still yet further embodiment again, the client application configuring the processor to encrypt the cryptographic data using the device protection key also includes the client application configuring the processor to encrypt the cryptographic data using a provisioned encryption key and encrypting the provisioned encryption key using the device protection key.

In still yet another embodiment again, the client application also configures the processor to access content encrypted using the cryptographic data.

In a still yet further additional embodiment, the client application configuring the processor to access content encrypted using the cryptographic data also includes the client application configuring the processor to collect the combination of device characteristics that uniquely identify the device using information stored on the device and accessible to the device, generate device match data based upon the collected combination of device characteristics, generate a device protection key using the device match data, access the encrypted cryptographic data using the device protection key, and access the content using the cryptographic data.

In still yet another additional embodiment, the client application also configures the processor to validate the identity of the device.

In a yet further additional embodiment again, the client application configuring the processor to validate the identity of the device also includes the client application configuring the processor to collect the combination of device characteristics that uniquely identify the device using information stored on the device and accessible to the device, generate device match data based upon the collected combination of device characteristics, and compare the generated device match data to stored device match data associated with the device.

In yet another additional embodiment again, the client application configuring the processor to compare the generated device match data to stored device match data associated with the device also includes the client application configuring the processor to generate a token using the generated device match data and comparing the token to a stored token.

In a still yet further additional embodiment again, a machine readable medium contains processor instructions, where execution of the instructions by a processor causes the processor to perform a process that includes collecting a combination of device characteristics that uniquely identify a device using information stored on the device and accessible to the device, generating device match data based upon the collected combination of device characteristics, generating a device protection key using the device match data, encrypting the cryptographic data using the device protection key, and storing the encrypted cryptographic data in device memory.

DETAILED DISCLOSURE OF THE INVENTION

Figure 1:
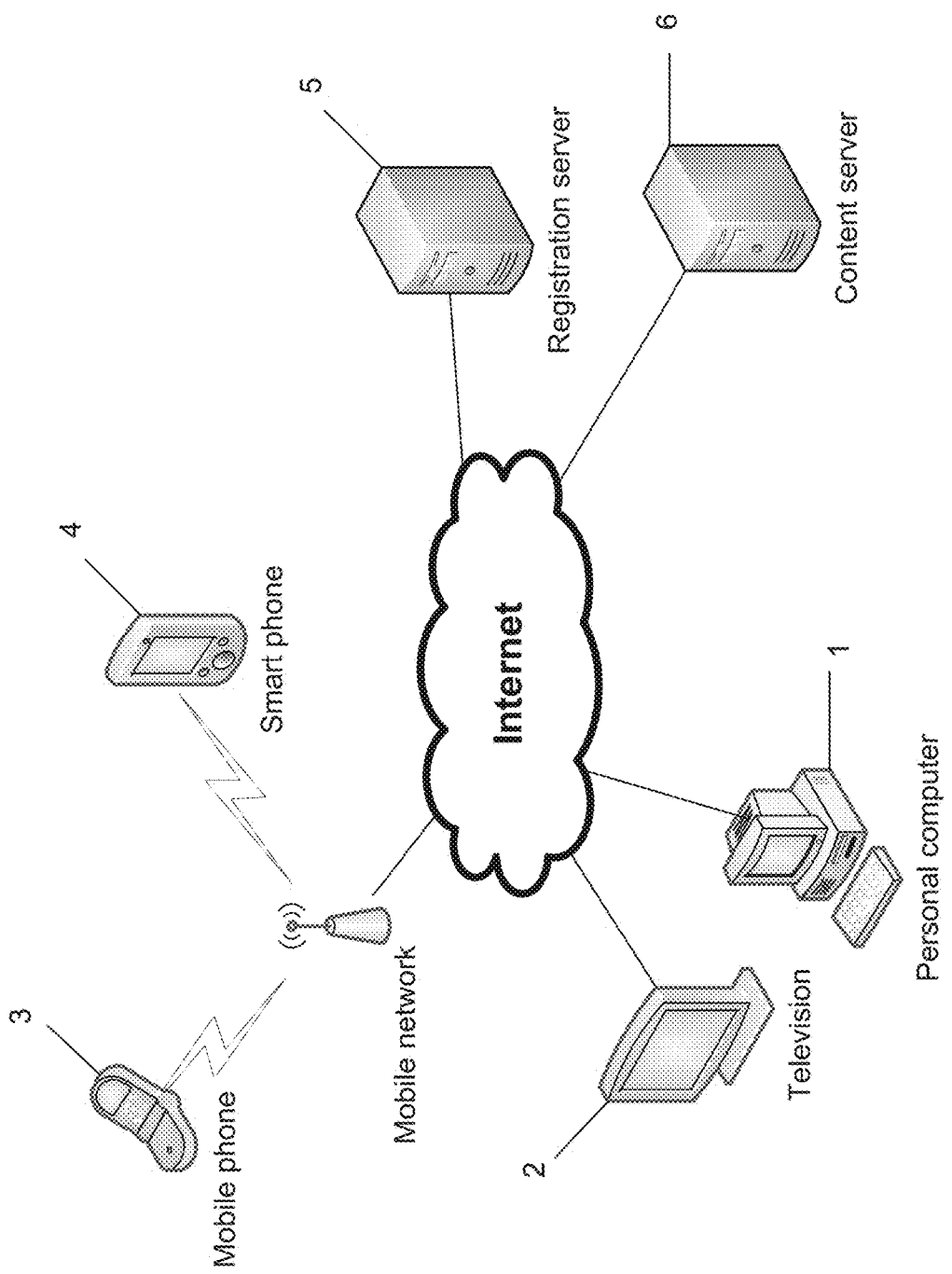
FIG. 1 is a system diagram illustrating a DRM and content distribution system in accordance with an embodiment of the invention.

Turning now to the drawings, systems and methods for binding of cryptographic content to a playback device using unique characteristics of the device with server heuristics are illustrated. Playback devices can include personal computers, digital disk players, and cellular phones. Ideally, all devices participating in a digital rights management (DRM) system are uniquely identifiable to the DRM system. However, manufacturing a consumer electronics device so that it includes a unique piece of data stored in its non-volatile memory can be expensive and complex. Therefore, many DRM systems load a shared secret onto a device at the time the device is registered with the DRM system. The shared secret typically takes the form of cryptographic data that can be utilized to decrypt content, which has been specifically encrypted for decryption using the cryptographic data. In many DRM systems, the cryptographic data issued by the DRM system is unique to the device. In several. DRM systems, the cryptographic data issued by the DRM system is unique to a specific user account and is shared by a number of devices that are registered to the user account.

The shared secret may be restricted to be known only to the content provider (such as a digital video content server) or a system performing encryption for the content provider (such as a third-party trusted system) and to the content receiver (such as a playback device). In some embodiments, the shared secret may be a combination of keys used together, such as a base or domain key embedded in a device, a device key issued for a particular device upon registration, and/or user keys associated with user accounts. DRM systems and methods using encryption keys issued to devices and/or user accounts include those disclosed in U.S. Pat. No. 7,295,673 entitled "Method and System for Securing Compressed Digital. Video," U.S. Pat. No. 7,460,668 entitled "Optimized Secure Media Playback Control," and U.S. Pat. No. 7,515,710 entitled "Federated Digital. Rights Management Scheme Including Trusted Systems," the disclosures of which are hereby incorporated by reference in their entirety. In a number of embodiments, cryptographic data issued to a user device upon registration includes one or more user keys used to decrypt content and SSL certificates used to authenticate connections to a server. In several embodiments of the invention, the cryptographic data is stored in non-volatile memory on a playback device. Although specific DRM systems are referenced in the above patents, systems and methods in accordance with embodiments of the invention can be utilized in any of a variety of DRM systems.

Cryptographic data issued in the manner described above, however, can be used to create a clone device by copying the cryptographic data onto a similar device. Such devices can be difficult for a DRM system to detect, because the system relies upon the cryptographic data to identify the device. In many embodiments of the invention, cryptographic data issued to a playback device is securely stored on the playback device using a cryptographic key generated using data collected by the playback device concerning the characteristics of the device. In order to enable a variety of different types or categories of device to operate within the DRM system, the specific pieces of data collected by each different type of playback device to generate the cryptographic key can vary.

As stated above, embedding a unique identifier on a device that exists primarily to facilitate provisioning in the DRM system can be expensive and complex. In operation, a combination of a predetermined set of device characteristics can be sufficiently distinctive as to be uniquely identifying. Device characteristics can be understood as referring to those attributes that are inherent to the device, that were not placed on the device expressly for the purpose of identification in a DRM system. Typically, these attributes are not known by a DRM system to be associated with a particular device before the device has some initial contact (e.g., registering or activating) with the DRM system. Many times, these are attributes of a device or pieces of information that were associated with the device for some other purpose when it was manufactured or when software was loaded onto the device. In some sense, systems and methods in accordance with embodiments of the invention repurpose that information, such that they, alone or in combination with one or more other attributes of the device, provide identifying and/or unique information about the device to a DRM system. In many embodiments, several device characteristics are represented by information about the device that can be obtained from the device or its hardware or software components. Device characteristics can include (but are not limited to) a Media Access Control. (MAC) address stored on the device's network interface card (NIC), serial numbers built into chips on the device, serial numbers or license keys of the operating system, BIOS IDs, and product IDs. The specific pieces of data that are utilized to identify the device can differ from one category of device to the next based upon the information available to any given device. In many embodiments, different categories of device use different combinations of device characteristics to generate unique identifiers that share a common predetermined format. In this way, the DRM system can communicate with a device and verify its identity without knowing the type of device.

Device characteristics and the representations of device characteristics in different literal forms can be referred to as device match data. A single piece of device match data that corresponds to a single device characteristic can be referred to as an item of device match data. Where the device match data only includes a single item of device match data, the item effectively is the device match data. In many embodiments of the invention, device match data is collected by a playback device at the time of registration and then utilized to identify the playback device during subsequent transactions with the DRM system. Different devices have different device characteristics and in many instances will have access to different pieces of information for the purpose of generating device match data. In several embodiments, each class of playback device or different product has the ability to generate device match data using a different set of device characteristics. In many embodiments, irrespective of the device characteristics utilized to generate the device match data, the process used to generate the device match data generates device match data that complies with a predetermined format. In a number of embodiments of the invention, a set of cryptographic hash functions is utilized so that the device match data is a standard length across all playback devices irrespective of the characteristics of the playback devices utilized to generate the device match data. The device match data can be utilized to register the playback device with a DRM system. Use of commonly formatted device match data facilitates management of device match data by a registration server and enables the overall DRM system to communicate with devices in a way that is independent of the type of device.

In several embodiments of the invention, device match data can also be used to generate a device protection key used to encrypt cryptographic data stored within the non-volatile memory of the playback device. When the device match data has uniform length, a common process can be utilized to generate an encryption key from the device match data. In several embodiments, the length of the device match data varies between playback devices, and the process for generating a device protection key involves the use of cryptographic hash functions that generate an encryption key of a standard length. When a standard length encryption key is generated, the key can be provided as an input to a common encryption algorithm. In a number of embodiments, multiple encryption keys including the device protection key are utilized to protect the cryptographic data. In several embodiments, a product key is used to encrypt the cryptographic data stored in the non-volatile memory of a playback device and the device protection key is used to encrypt the product key. In yet further embodiments, both the device protection key and the product key are used to encrypt the cryptographic data. Some or all of the device match data can be used to generate the device protection key.

The process used to generate the device protection key can be considered a shared secret, known only to the registration server and device.

In a number of embodiments of the invention, a device protection key is generated by a playback device when the device registers with a system or when a device powers on. In some embodiments of the invention, when a playback device attempts to connect to a server or request or play content, or perform another function requiring authentication, it sends its device match data to a server to be verified against the device match data it possessed when it registered. While certain functions are described herein, uses of device characteristics, device match data, and device protection keys in accordance with embodiments of the invention are only limited to the requirements of a specific DRM and/or content delivery system. Content delivery systems and the use of device match data to authenticate different types of playback devices and to protect encrypted cryptographic data issued to playback devices in accordance with embodiments of the invention are discussed further below.

System Architecture

In many embodiments of the invention, a DRM and/or content distribution system includes devices and servers that utilize device match data to identify devices and bind content to the devices. In many embodiments, the DRM system supports different classes of playback device and each class of playback device can generate device match data using a different set of device characteristics. In several embodiments, the device match data complies with a standard format including but not limited to the length of the device match data so that common processes can be applied to the device match data irrespective of the type of device that generated the device match data and/or the device characteristics that form the basis of the device match data.

A DRM system, which implements device match data, in accordance with an embodiment of the invention is shown in FIG. 1. Playback devices such as a personal computer 1, television 2 (with or without an attached disk or media player), mobile phone 3, and smart phone 4 possess device characteristics, from which device match data can be derived. Circuits and/or applications on the devices are designed to generate device match data used to verify the device and/or generate a device protection key as described below.

Device match data can be used by a device 1-4 to register with a registration server 5, and used by a device or server 5 to generate a device protection key used to access encrypted cryptographic data. A device can also use device match data to authenticate or verify itself to the server when requesting content from a content server 6. In many embodiments of the invention, devices must also verify device match data before playing back content or performing other restricted functions. Different classes of playback device can utilize different processes to generate device match data. In many embodiments, the process utilized to generate the device match data depends upon the data concerning device characteristics available to the playback device.

A registration server 5 can register playback devices, and store information related to individual user accounts including (but not limited to) cryptographic data and information regarding devices registered to a user account. Registration server 5 can also store device match data associated with each device to act as a reference for future verification of the device.

Playback Devices

Figure 2:
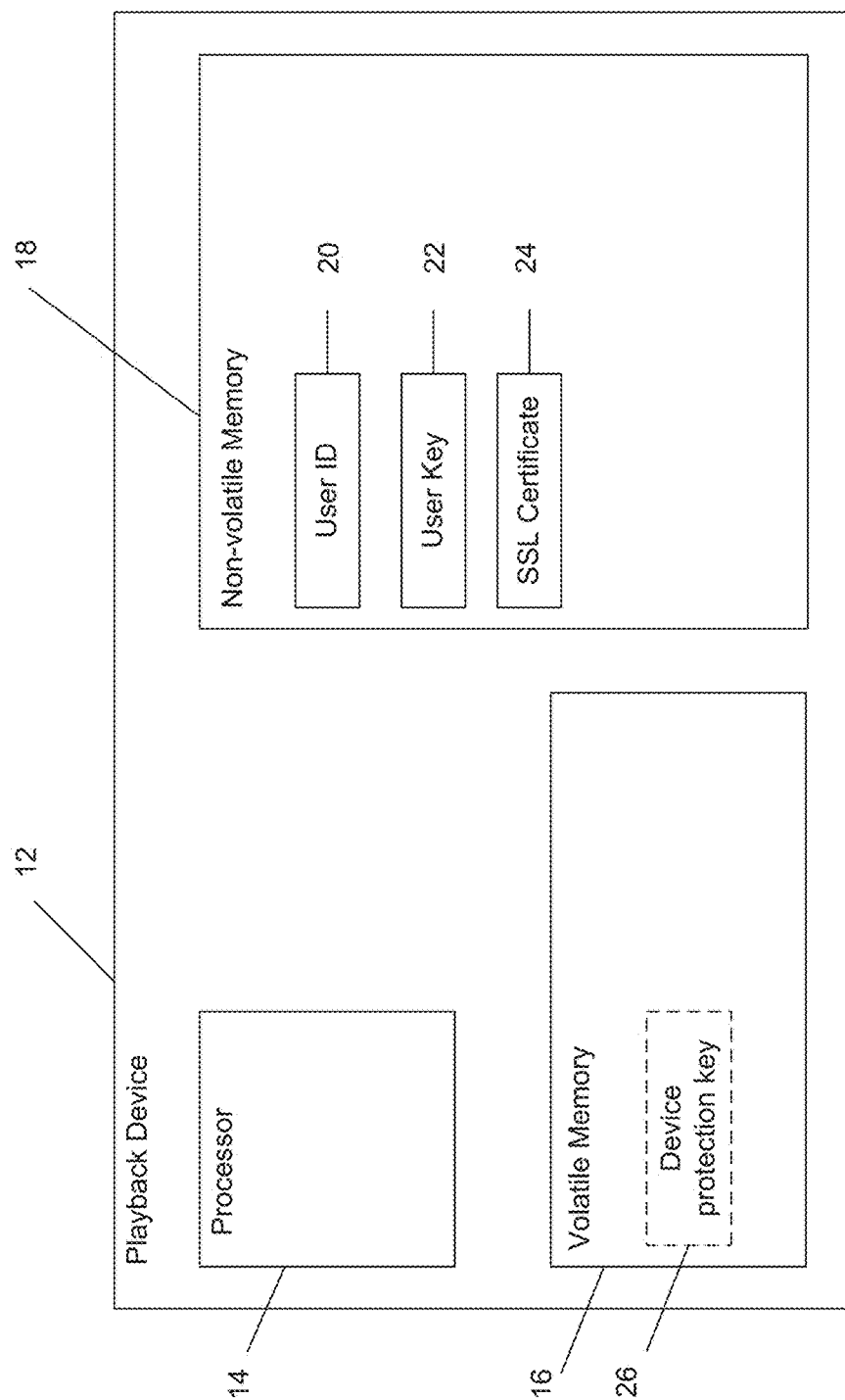
FIG. 2 conceptually illustrates a playback device, which stores encrypted cryptographic data used to decode content and that generates a device protection key to access the cryptographic data in accordance with an embodiment of the invention.

In many embodiments of the invention, playback devices are configured to generate device match data by gathering information concerning the characteristics of the playback device. In operation, the information concerning device characteristics available to a playback device typically depends upon the type of playback device. Depending upon the type of playback device, information concerning specific device characteristics is collected and utilized to generate device match data. In many embodiments, the length and/or format of the device match data is uniform across all categories of playback device. The device match data can then be utilized to register the playback device and to generate a device protection key, which is used to access encrypted cryptographic data stored on the playback device, using a common process irrespective of the type of playback device. A playback device in accordance with an embodiment of the invention is shown in FIG. 2. The playback device can be used to generate device match data and a device protection key to access encrypted cryptographic data using, for example, a process similar to the processes illustrated in FIGS. 4 and 5 (see discussion below). The playback device 12 includes a processor 14, non-volatile memory 16, and volatile memory 18. Cryptographic data, which can be used to decrypt encrypted data or create secure connections to other systems, is stored in the non-volatile memory. In many embodiments, the cryptographic data includes (but is not limited to) a user ID 20 that is a unique identifier for a user account, a user key 22 used in decryption of content, and a SSL certificate 24 used in creating secure connections with other devices via Hypertext Transfer Protocol. Secure (HTTPS). HTTPS is a combination of the Hypertext Transfer Protocol. (HTTP) with Secure Sockets Layer/Transport Layer Security (SSL/TLS) protocol to provide encrypted communication and secure identification of a network device. In other embodiments, any of a variety of identifiers, keys, certificates and other types of information can be stored as cryptographic data on a playback device. The non-volatile memory 16 can also be utilized to store the processor instructions utilized to configure the playback device to perform processes in accordance with embodiments of the invention. In other embodiments, the playback device software and/or firmware can be stored in any of a variety of computer readable media appropriate to a specific application.

In many embodiments of the invention, the cryptographic data is obtained from a registration server at the time the playback device is registered with a DRM system. In a number of embodiments, the registration process involves the collection of device match data by the playback device and the device match data and/or information derived using the device match data is provided to the registration server. Both device match data and information derived from device match data can be and are collectively referred to herein as device match data.

In several embodiments of the invention, the cryptographic data issued by the registration server is encrypted using a unique device protection key that is generated using the device match data as described below. When the playback device accesses the encrypted cryptographic data, the processor collects the device data match data and generates the device protection key 26. During operation, the device protection key 26 can be stored in volatile memory 16 for temporary use. In the event that the device match data changes due to a change in the device characteristics or due to an attempt to clone a playback device, the registration server can decide whether to issue new cryptographic information to the playback device (i.e. re-register the device) or to deny the playback device's request. In this way server heuristics can be utilized to accommodate changes in the processes and or pieces of information utilized to generate device match data. The server can re-register the device and the user is unaware that a modification has been performed with respect to the manner in which encrypted cryptographic data is stored on the playback device. The software utilized to configure the processor is typically stored in the non-volatile memory or firmware of the playback device. However, in many embodiments, the software can be stored on other forms of storage including (but not limited to) a hard disk drive.

Although a specific playback device is illustrated in FIG. 2, any of a variety of playback devices configured to store encrypted cryptographic data and to collect information concerning device characteristics can be utilized in accordance with embodiments of the invention. Registration of playback devices using device match data and the use of device match data to access encrypted cryptographic data issued by a registration server are discussed further below.

Registration of Playback Devices

Figure 3:
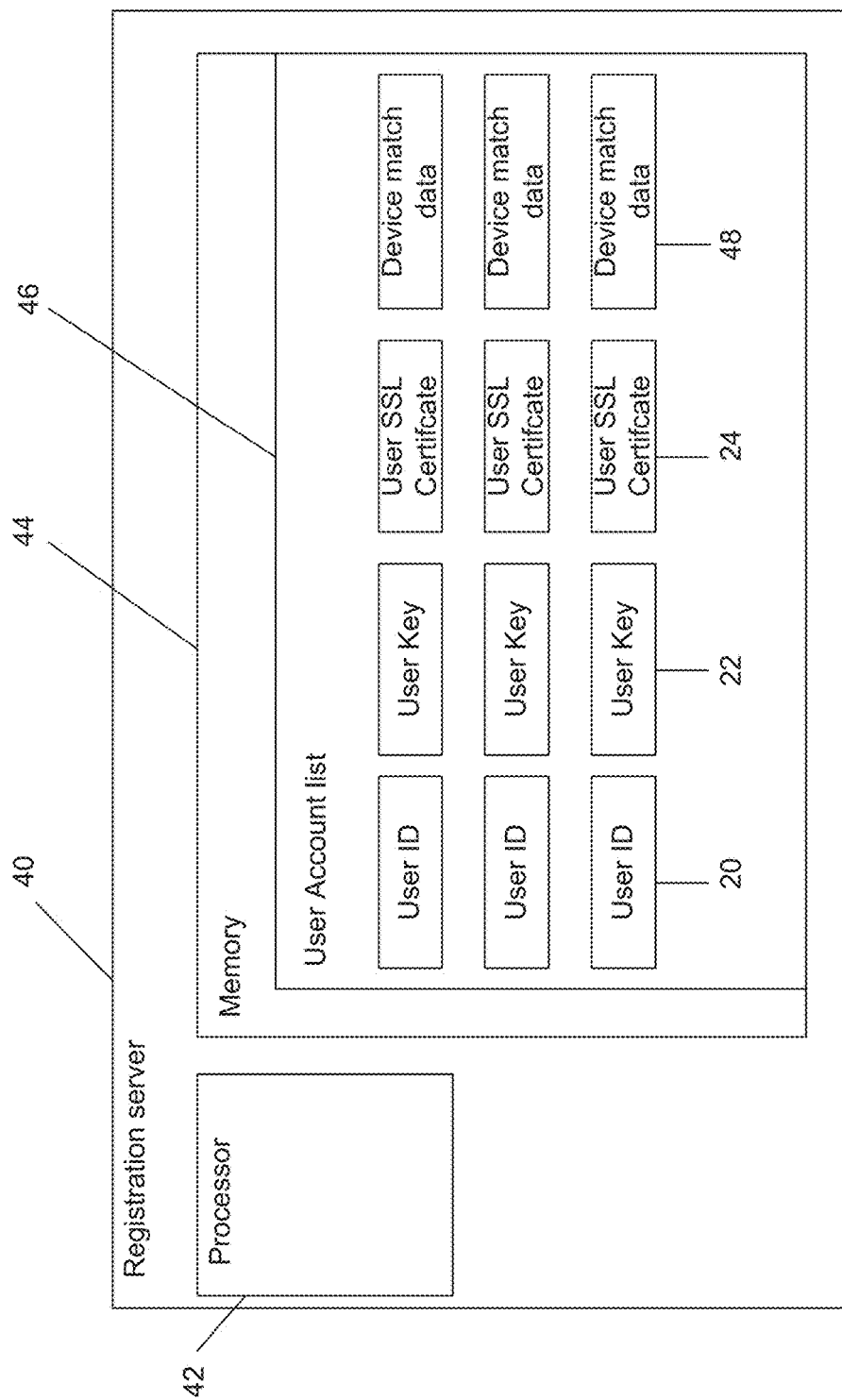
FIG. 3 conceptually illustrates a registration server, which stores information related to user accounts including (but not limited to) cryptographic data, in accordance with an embodiment of the invention.

In many embodiments of the invention, a registration server registers playback devices, and stores information related to individual user accounts including (but not limited to) cryptographic data and information regarding devices registered to a user account. A registration server, in accordance with an embodiment of the invention is shown in FIG. 3. The registration server 40 has a processor 42 and memory 44, in which a user account list 46 is maintained. Although the user account list is shown in FIG. 3 as being stored in memory, in many embodiments of the invention user account information can be stored in any form (including but not limited to) a database and on any form of machine readable media. The user account list 46 contains identifying and cryptographic data for user accounts in the system, such as a user ID 20, user key 22, and/or SSL certificate 24 for each user account. The user account list also stores device match data 48 of devices associated with each user account. Although the user account illustrated in FIG. 3 includes specific pieces of information stored with respect to each user account, the specific user account information maintained by a registration server in accordance with embodiments of the invention is typically only limited by the requirements of a specific application.

In many embodiments of the invention, a device performs an initial procedure to compute and store device match data. In several embodiments, different procedures are utilized by different types of device. In a number of embodiments of the invention, the registration server receives and stores device match data from a playback device during a registration process. The use of stored device match data to verify a particular device when it sends current device match data as part of a verification process in accordance with embodiments of the invention is discussed further below. In yet further embodiments of the invention, the registration server creates a device protection key from device match data and sends cryptographic data encrypted with the device protection key to a device. In other embodiments, the registration server securely sends the encrypted cryptographic data to a playback device and the playback device encrypts the cryptographic data using at least a device protection key generated using the device match data.

Although a specific registration server is illustrated in FIG. 3, any of a variety of servers configured to issue encrypted cryptographic data to playback devices and store user account information including device match data appropriate to a specific DRM system can be utilized in accordance with embodiments of the invention. Processes for generating device match data from device characteristics in accordance with embodiments of the invention are discussed further below.

Generating Device Match Data

In many embodiments of the invention, device match data can be raw data that represents a device characteristic or a set of various device characteristics. In several embodiments of the invention, device match data can also be formatted as a hash value or some other function of the raw data representing the device characteristic or characteristics. For example, a unique attribute can be a MAC address whose raw data value is six groups of two hexadecimal digits. A unique attribute can also be the license key for software on the device whose raw data value is an alphanumeric string. In many embodiments, the device match data is a combination of unique characteristics. Because the raw data values in a set of device match data may be long and of differing lengths, it is desirable to use representations that are shorter and of uniform length. Such representations can be achieved by many methods, one of which is a cryptographic hash function.

A cryptographic hash function is a procedure or algorithm that takes an arbitrary block of data and returns a fixed-size bit string, the hash value, such that an accidental or intentional change to the data will change the hash value. A cryptographic hash function typically has four significant properties: it is easy to compute the hash value for a given input value, it is infeasible to generate an input value that has a given hash value, it is infeasible to modify an input value without changing the resulting hash value, and it is infeasible to find two input values with the same hash value. In many embodiments, device characteristics are represented and used as device match data by passing raw data representative of at least one device characteristic through a cryptographic hash function to determine a hash data value that is uniform in length and unique. This corresponding hash data value, being as unique as the raw source data, is just as representative of the device characteristic(s) as the raw data. Therefore, the hash value is device match data, a more concise and usable form of representing a device characteristic. As noted above, providing device match data having common formatting and/or length enables common processes to be applied to the device match data irrespective of the device type and/or device characteristics utilized to generate the device match data.

Processes for registering devices with a registration server and for generating device protection keys using device match data in accordance with embodiments of the invention are discussed further below.

Processes for Generating Device Match Data and Device Protection Keys on Playback Devices In many embodiments of the invention, a device performs an initial procedure to compute and store device match data as a reference set for future verification. The stored reference set can also be referred to as stored or registered device match data.

Figure 4:
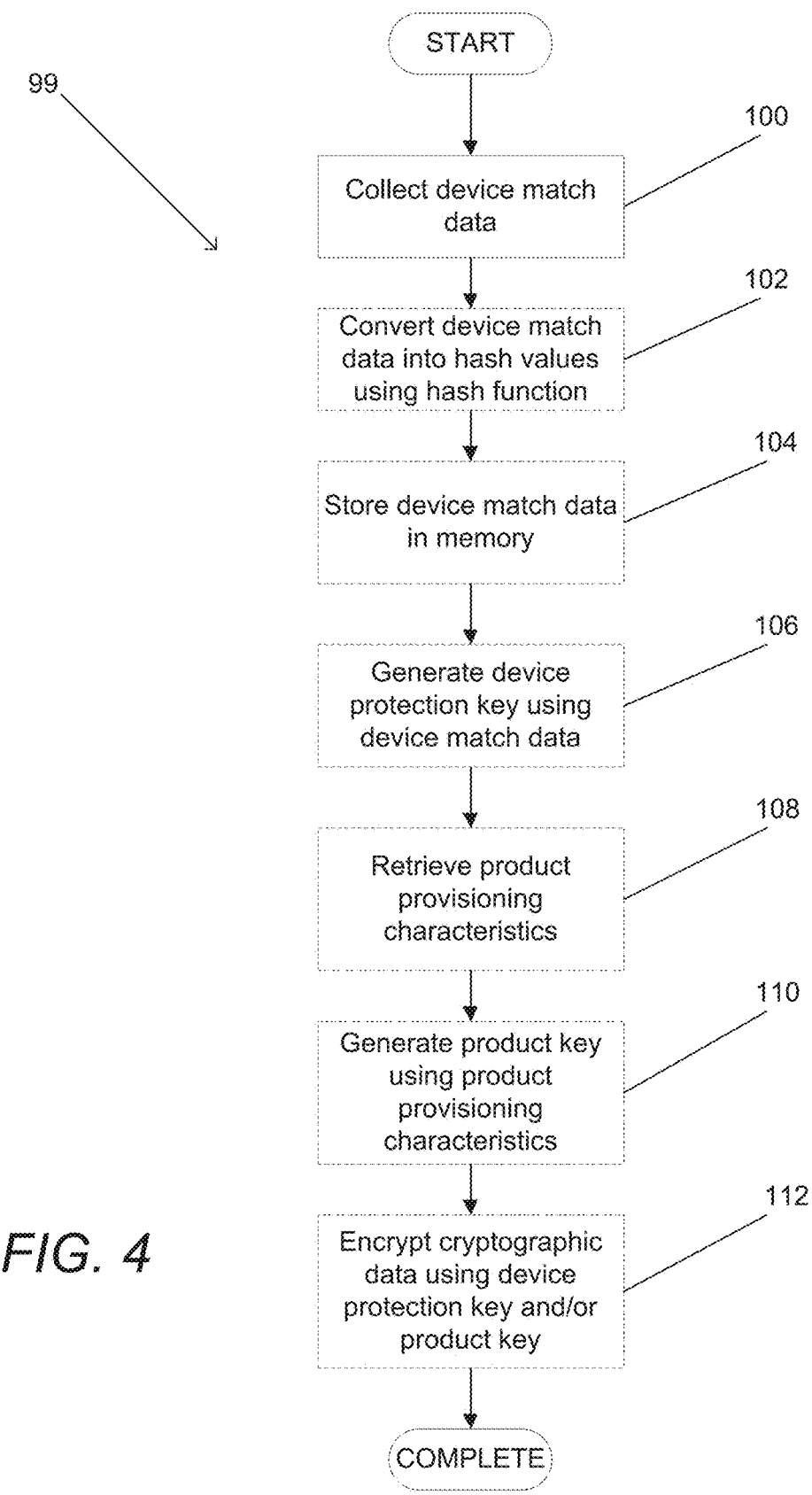
FIG. 4 is a flow chart illustrating a process for computing, processing, and storing device match data and protecting cryptographic data using device match data, in accordance with an embodiment of the invention.

A flow chart illustrating a process for computing and storing device match data on a device and protecting cryptographic data using device match data, in accordance with an embodiment of the invention is shown in FIG. 4. The process 99 involves discovering or collecting (100) device match data that represents device characteristics from its hardware and/or software components. Items that may be collected can include a Media Access Control. (MAC) address stored on the device's network interface card (NIC), serial numbers built into chips on the device, serial numbers or license keys of the operating system, BIOS IDs, and/or other information that alone or in combination can be utilized to uniquely identify the device. Generally, these items are discoverable and can be read from memory or requested by polling or sending an instruction to a component within the playback device. In several embodiments, the discoverable data may be processed via a function such as (but not limited to) a hash function as part of the discovery process. In this way, an item of device match data may in fact be a hash of a piece of information that is discoverable within the playback device. As noted above, device match data can be a single item or a combination of multiple items of device match data.

The device can use one or more cryptographic hash functions to derive (102) hash values for items of device match data. As discussed above, hashing preserves the uniqueness of each item of device match data while converting it into a form that is more efficient and uniform.

The items of device match data are stored (104) in the clear or in an encrypted form. A device match data identifier (DMD ID) can be associated with each item of device match data to describe the attribute it represents and distinguish the item from others that describe other attributes of the device.

In further embodiments of the invention, cryptographic data on the device can be encrypted using a device protection key derived from device match data. The device uses device match data to generate (106) a device protection key. Cryptographic data on the device is then encrypted (112) using the device protection key.

In yet further embodiments of the invention, it may be desirable to implement more levels of protection by using additional encryption keys, such as a product key derived from product provisioning characteristics, when encrypting the cryptographic data. A DRM system may associate additional proprietary information with devices, such as identifiers for device models, classes, or product lines. Identifiers can be specific to hardware configurations, software configurations, or combinations of hardware and software. The identifiers and other data may be relevant to how the device is provisioned and/or categorized in the DRM system. These identifiers and other information can be collected (108) from the device as product provisioning characteristics.

Therefore, the device can also use product provisioning characteristics to generate (110) a product key that can be utilized in the encryption (112) of the cryptographic data. In some embodiments, product provisioning characteristics may be unique only to a particular device model or product line, and already assigned to that class of device. It follows that a product key may have already been determined and assigned to the class of device possessing those product provisioning characteristics.

Although a process is described above with reference to FIG. 4 in which a playback device generates both device match data and a device protection key locally, in many embodiments a server can generate a device protection key remotely and use the remotely generated device protection key in the encryption of cryptographic data provided to the playback device during registration. Generating device match data on a device and generating a device protection key using a server in accordance with embodiments of the invention are discussed further below.

Processes for Generating Device Match Data Using Playback Devices and Generating Device Protection Keys Using Servers A playback device in accordance with embodiments of the invention registers with a registration server and acquires credentials (e.g., the cryptographic data) used in decrypting and/or decoding DRM protected content. In several embodiments of the invention, device match data provided to a server by a playback device is stored or associated with a user account when a device registers with a registration server in a DRM system.

Figure 5:
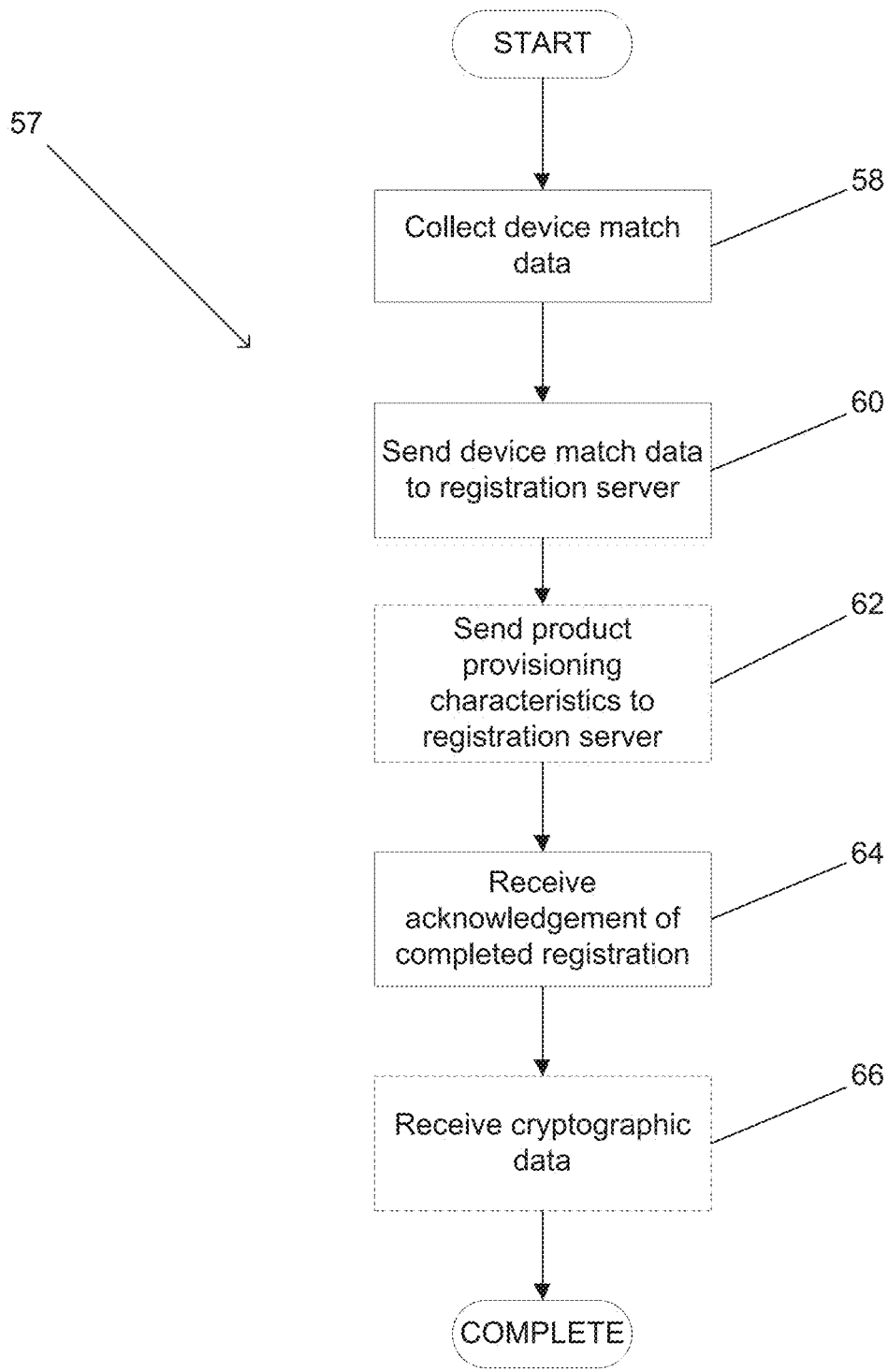
FIG. 5 is a flow chart illustrating a process that can be used for a playback device to send device match data when it registers with a registration server, in accordance with an embodiment of the invention.

A process for registering with a registration server using device match data, in accordance with an embodiment of the invention is shown in FIG. 5. The process 57 includes discovering or collecting (58) device match data from hardware and/or software components of a playback device. The playback device sends (60) its device match data to the registration server. In some embodiments, the playback device hashes the device match data before they are sent to the registration server. If the DRM system utilizes product provisioning characteristics which are stored on the playback device (discussed above), they can also be sent (62) to the registration server by the playback device.

In many embodiments of the invention, the registration process involves sending encrypted cryptographic data from the server to the device. In several embodiments of the invention, the cryptographic data is encrypted using a device encryption key. As described below, the registration server can use device match data to generate a device protection key and encrypt cryptographic data for the playback device using the device protection key and/or product key. The playback device receives (66) the encrypted cryptographic data, which may be encrypted with a device protection key and/or product key, from the registration server. The encrypted cryptographic data is written to non-volatile memory or otherwise stored on the device.

Figure 6:
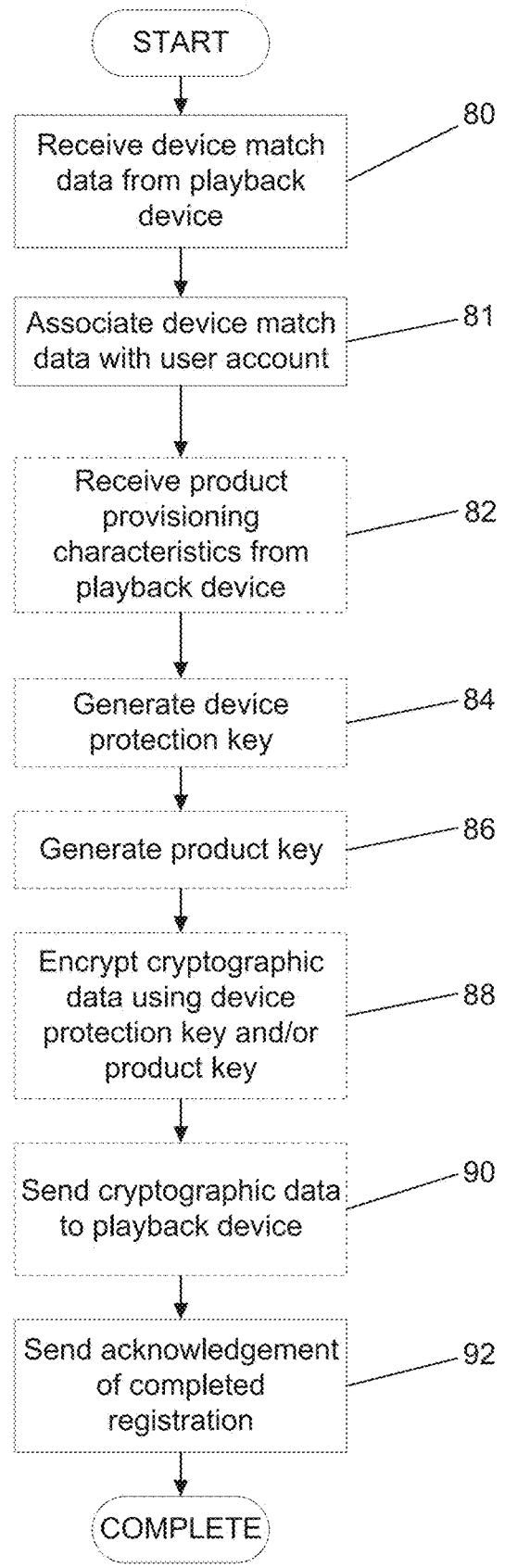
FIG. 6 is a flow chart illustrating a process that can be used for a registration server receiving device match data during the registration of a device, in accordance with an embodiment of the invention.

In many embodiments of the invention, a registration server receives and stores device match data during device registration. A flow chart illustrating a process that can be used by a registration server receiving device match data during the registration of a device, in accordance with an embodiment of the invention is shown in FIG. 6. The server receives (80) device match data from a playback device that is attempting to register with the server. The device match data may be hashed or raw device match data. In the illustrated embodiment, the device match data is stored (81) in a user account list and associated with the user account that the device is registering under. In other embodiments, any of a variety of data storage techniques appropriate to a specific application can be utilized to associate device match data with a specific user account. The server can also receive product provisioning characteristics such as a product identifier from the playback device (82). In several embodiments, the server uses the device match data to generate a device protection key specific to the device (84) and encrypts (88) the cryptographic data using the device protection key. In other embodiments, the server securely transmits the encrypted cryptographic data to the device and the playback device locally generates the device protection key and uses it to encrypt its copy of the cryptographic data.

In some embodiments it may be desirable to implement more levels of protection by using additional encryption keys, such as a product key, when encrypting the cryptographic data. Therefore, the server can also use product provisioning characteristics to generate a separate product key (86) that can be utilized in the encryption (88) of the cryptographic data either on the server or on the playback device.

The encrypted cryptographic data is sent to the playback device (90). While the process described assigns cryptographic data to one playback device, in several embodiments the same cryptographic data can be issued to multiple devices registered under the same user account with the registration server. In several embodiments, an acknowledgement of completed registration is sent to the playback device (92).

Although specific registration processes are described above, any of a variety of registration processes that utilize device match data can be utilized in accordance with embodiments of the invention. Processes for accessing encrypted cryptographic data issued to a registered playback device and encrypted with a device protection key generated using device match data in accordance with embodiments of the invention are discussed further below.

Accessing Encrypted Cryptographic Data Protected Using a Device Protection Key

In many embodiments of the invention, encrypted cryptographic data on a playback device is protected using a device protection key. In several embodiments, the technical protection utilized by the playback device utilizes a combination of keys including (but not limited to) a device protection key and a product key. Accessing the encrypted cryptographic data thus involves recovering the device protection key and any other keys that may be used to protect the encrypted cryptographic data.

Figure 7:
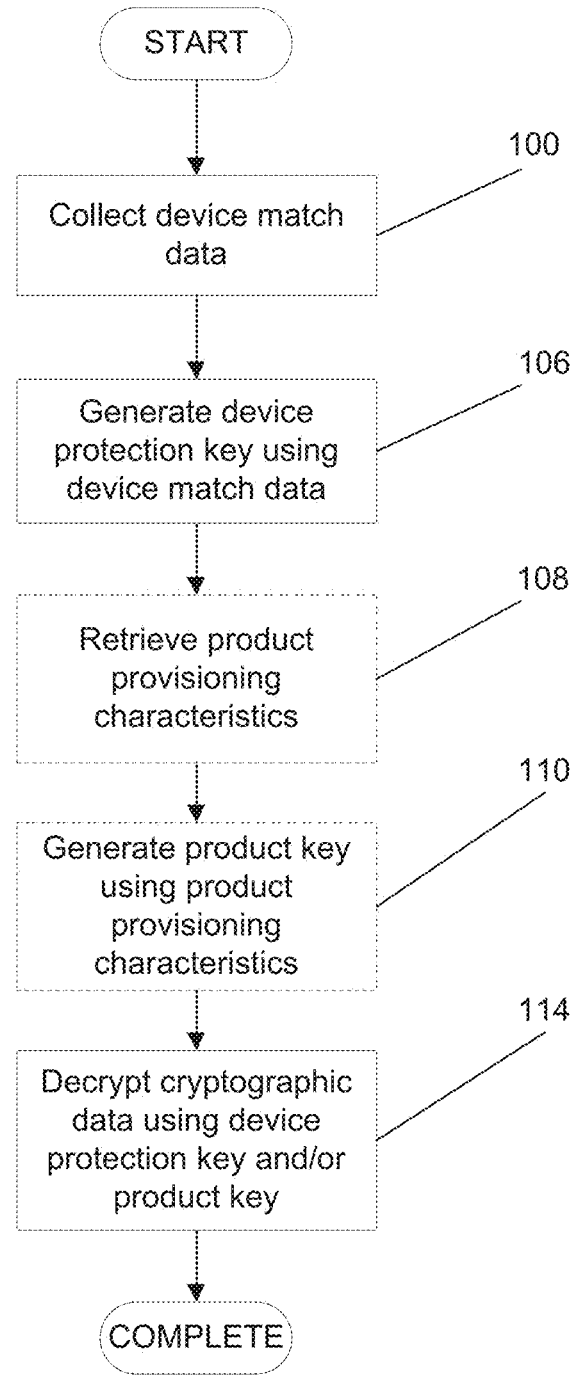
FIG. 7 is a flow chart illustrating a process to access encrypted cryptographic data using a device protection and/or product key in accordance with an embodiment of the invention.

A process for accessing encrypted cryptographic data protected using a device protection key in accordance with an embodiment of the invention is shown in FIG. 7. Many steps are analogous to encrypting the cryptographic data. The device collects (100) device match data from its hardware and/or software components. A device protection key is generated (106) using the device match data. In many embodiments, product provisioning characteristics can be retrieved (108) and used to generate (110) a product key. Provided that the encrypted cryptographic data resides on the device that it was intended and encrypted for (i.e., the device match data used to generate the key is the same), the encrypted cryptographic data can be decrypted (114) using the device protection key and/or the product key. Discussed further below are algorithms that can recognize changes in device match data that are determined to be minor and permissible, and allow the encryption of the cryptographic data to be refreshed or updated using newer device match data.

Although a specific process is discussed above with respect to FIG. 7, any of a variety of processes for accessing encrypted cryptographic data protected using a device protection key generated using device match data can be utilized in accordance with embodiments of the invention. Processes for verifying registered playback devices using their device match data in accordance with embodiments of the invention are discussed further below.

Verification of Device Match Data

Figure 8:
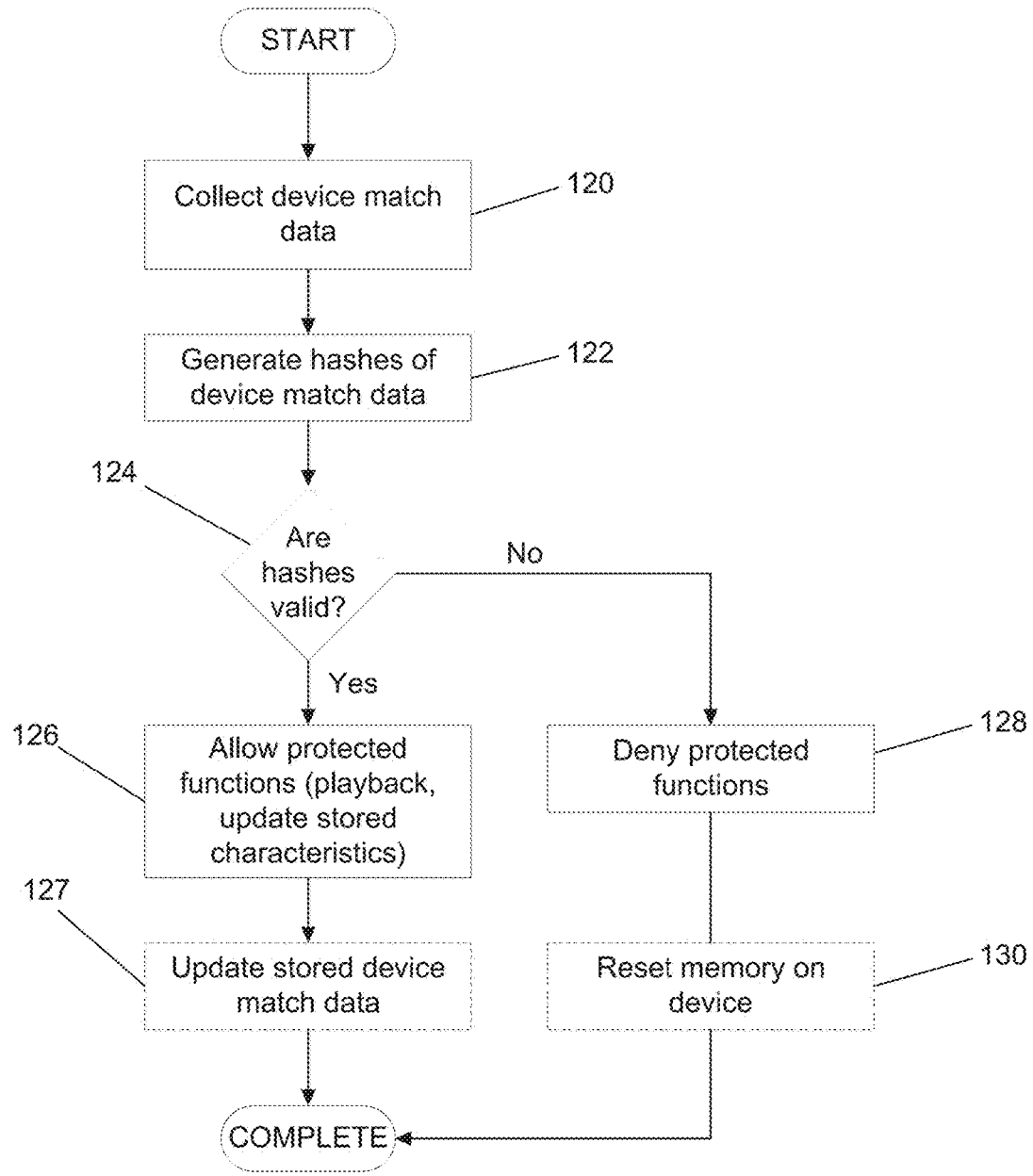
FIG. 8 is a flow chart illustrating a process for verifying device characteristics in accordance with an embodiment of the invention.

Verification of device match data can be useful to detect and prevent tampering with a device's memory and/or the cloning of devices. In the absence of a server, a device can self-verify its device match data. In many embodiments of the invention, a device may verify its device characteristics, for example, during a power-on operation, when content is played, or when content is requested. A process for verifying device characteristics in accordance with an embodiment of the invention is shown in FIG. 8. The device discovers or collects (120) device match data from its hardware and/or software components, as described above. The device uses one or more cryptographic hash functions to derive (122) hash values of the device match data. The hash function(s) used should be the same as those used to generate the stored hash values. The hash values are compared (124) to those stored on the device using a matching algorithm. Device characteristic identifiers can be used to identify corresponding values.

A matching algorithm can take a variety of forms in determining a match. For example, a simple algorithm can give a positive match if merely two items of device match data result in the same hash value. A more complex algorithm can weigh certain items of device match data or give different consideration to other items of device match data.

If the matching algorithm determines a positive match, the protected functions are allowed (e.g., playing back or requesting content) (126). Furthermore, the device match data stored in memory can be updated (127) with the current values. If there is no match, the protected functions are denied (128). The memory on the device can be reset (130) so that it is treated as a new device in the DRM system or other corrective measures can be taken.

In further embodiments of the invention, additional matching algorithms can be utilized to allow an evolution in device characteristics. Changes in some device characteristics may indicate suspicious activity, while changes in other device characteristics could be benign and typical to the normal operation of the device. For example, a change in the BIOS ID of a device and MAC address of a device could likely indicate that the memory was cloned from one device to another. Such a use may be prohibited by a DRM system and therefore blocked. On the other hand, a change in attributes such as the operating system version may simply be a software update to the current version appropriate for the device and permissible in the DRM system. A matching algorithm can implement logic that permits certain combinations of device characteristics to change and be updated to current values, and recognizes other combinations as suspicious. Similarly, in embodiments where a device stores device match data, a device can run such algorithms to recognize changes that are considered minor (such as updating system software) and allow device match data that is stored to be updated to current values. In many embodiments of the invention where a device stores encrypted cryptographic data that is encrypted with a device protection key that is generated with device match data, such algorithms can be used to recognize changes that are considered minor (such as updating system software), generate a new device protection key using current values, and re-encrypt the cryptographic data using the new device protection key.

Figure 9:
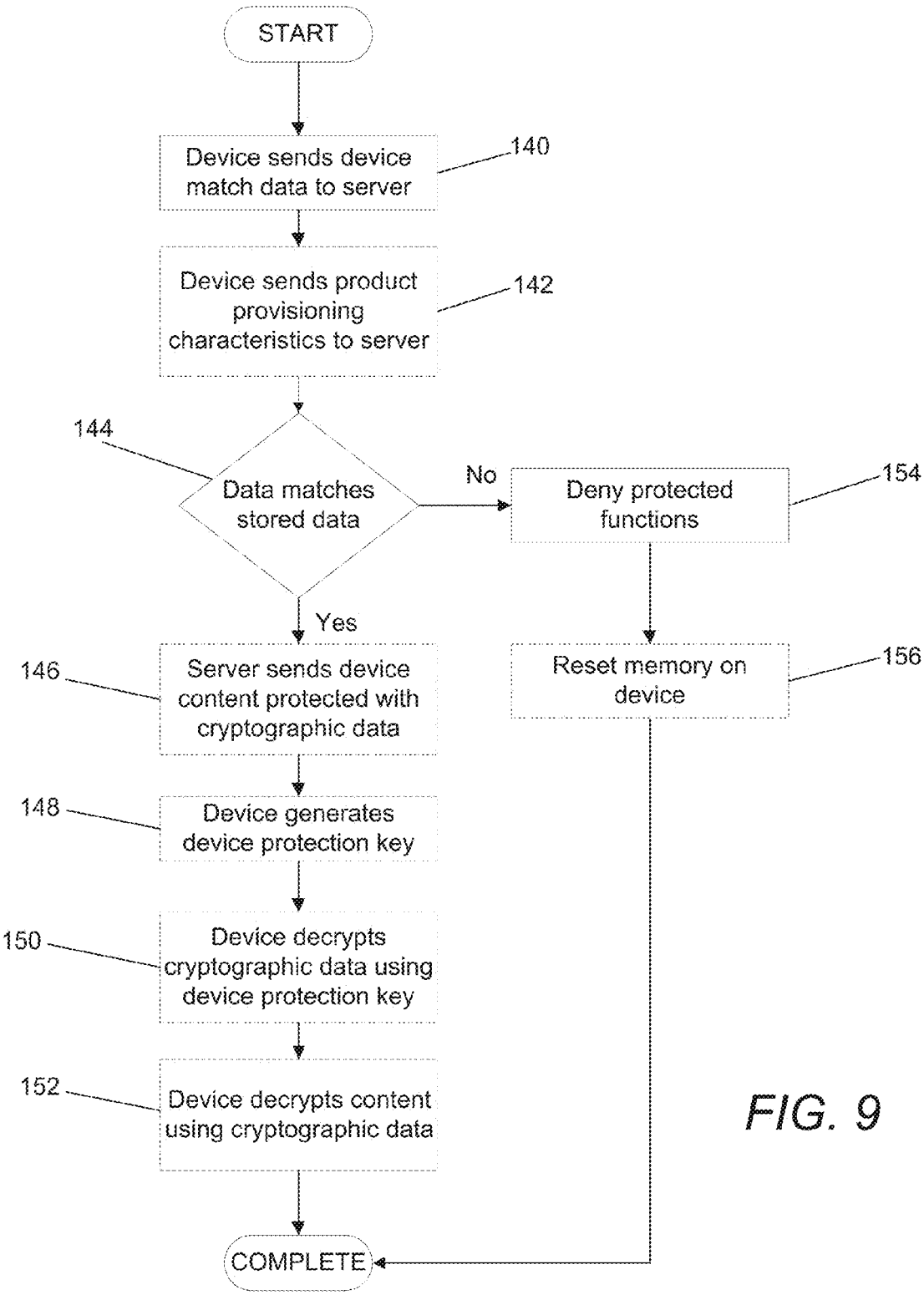
FIG. 9 is a flow chart illustrating a process for a server to verify device characteristics, in accordance with an embodiment of the invention.

In many embodiments of the invention, the verification process can be implemented where a server checks device match data against previously stored device match data. A flow chart illustrating a process for a server to verify device characteristics in accordance with an embodiment of the invention is shown in FIG. 9. In several embodiments of the invention, the server can be a registration server, content server, or other type or server with which the device needs to communicate. In various embodiments of the invention, the verification can be done when a device is requesting content, when otherwise communicating with a server, or independently of another session with the server. In further embodiments of the invention, a server can store previous verification sessions so that patterns of suspicious activity can be detected.

The device discovers or collects device match data from its hardware and/or software components, as described above. The device sends (140) the device match data to a server. The device can also send (142) product provisioning characteristics to the server. As described above in the registration process, a server has hash values for device match data of the device stored in memory. The server employs a matching algorithm (such as when a device sell-verifies as described above) to determine (144) whether the presently received device match data match the registered device match data stored for the device. If there is a positive match, the device is considered verified and can proceed with protected functions such as receiving content.

If the device had requested content from the server, the server sends (146) content encrypted with cryptographic data that is specific to the device and/or user. In some embodiments, the encrypted cryptographic data on the device is encrypted with a device protection key. The device may have already generated and stored a device protection key in memory (e.g., generating and storing the key in volatile memory upon power-on). If not, the device collects device match data from its components and generates (148) a device protection key. The device decrypts (150) the encrypted cryptographic data in non-volatile memory using the device protection key. The device uses the unencrypted cryptographic data to decrypt (152) the content received from the server.

If there is no match of device match data, the device is prevented (154) from executing protected functions. The memory on the device can be reset (156) so that it is treated as a new device by the DRM system or other corrective measures can be taken.

In further embodiments, the encrypted cryptographic data may have been encrypted with additional encryption keys, such as a product key.

In some embodiments, the registered device match data is stored on a registration server, trusted system, or other third-party system other than the server that the device has contacted. The server contacted by the device can coordinate with the third-party system to verify the device's match data. For example, a device may have contacted a content server to request content. While the content owner utilizes and has access to a DRM system that the device is registered with, the DRM system owner maintains security by not sharing the device's cryptographic data and registered device match data with the content owner. Instead, the DRM system receives content or a set of keys to be encrypted, encrypts it using cryptographic data, and returns it to the content server to pass on to the device. Or, the DRM can receive device match data to verify against registered device match data, and returns an affirmative or negative response. Thus, in such an embodiment, verification by the server (144) includes collecting and passing on the device match data to the DRM system to perform the matching.

In further embodiments, a server can record attempts by a device to verify its device match data. By maintaining such a record, and performing pattern matching, the server can detect suspicious activity where a device may have had its encrypted cryptographic data or other credentials copied to an unauthorized device. For instance, an unauthorized device may have memory copied from a device that has registered its device match data with a DRM system in accordance with embodiments of the invention. When the unauthorized device attempts to verify with the server, the device match data collected from the unauthorized device will not match the device match data registered with that user account. Repeated failed attempts at verification can result in flagging the device on the registration server.

Tokens to Preserve Verified Session or Represent Data

Tokens can be used as a credential to maintain a communication session between a server and client device so that the device does not have to identify itself and send other credentials which may be a larger amount of data. Tokens can also be a smaller representation of a larger set of data.

In several embodiments, when a device has opened a session with a server and verified its device match data, it may obtain one or more tokens to keep the session open without having to send device match data again and re-verify. In further communications with the server, the device can use the token to identify itself. The server may determine when a session is complete and expire the token, or expire the token after a certain amount of time has passed or uses of the token have occurred.

Just as computing hash values for device match data can reduce the bit length required to represent the device match data, a token can be created to represent the entire set of device match data. The amount of space used to store the token can be even less than that used to store the hash values.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of binding cryptographic data to a device, the device comprising a device processor, a volatile device memory, and a non-volatile device memory, the method comprising:
   (i) receiving cryptographic data from a registration server using the device processor;
   (ii) securing the cryptographic data on the device, wherein securing the cryptographic data on the device comprises:
      collecting a combination of device characteristics that uniquely identify the device using information stored on the device and accessible to the device using the device processor;
      generating device match data based upon the collected combination of device characteristics using the device processor;
      registering the device with the registration server by sending the generated device match data to the registration server in order for the registration server to associate the device match data with the user account;
      hashing the generated device match data and storing the hashed value in non-volatile memory using the device processor;
      generating a device protection key using the device processor and the device match data and storing the generated device protection key in the volatile device memory;
      encrypting the cryptographic data using the device processor and the generated device protection key, wherein the encrypted cryptographic data comprises at least an identifier of a user account and a user key; and
      storing the encrypted cryptographic data in the non-volatile device memory using the device processor;
   (iii) upon receiving an attempt to access a protected function, verifying device match data on the device, wherein verifying device match data on the device comprises:
      re-collecting the combination of device characteristics that uniquely identify the device using information stored on the device and accessible to the device using the device processor;

generating additional device match data based upon the re-collected combination of device characteristics using the device processor;

hashing the additional device match data to generate verification hash value using the device processor;

comparing the verification hash value to the stored hash value in the non-volatile memory using the device processor;

when the comparison indicates a match, allowing access to the protected function using the device processor; and when the comparison indicates a mismatch, resetting the non-volatile memory on the device using the device processor, thereby deleting encrypted cryptographic data stored in the non-volatile memory on the device;

and (iv) playing back a portion of a piece of encrypted content on the device, wherein playing back the portion of protected content comprises:

receiving, using the device processor, a piece of encrypted content, wherein the piece of encrypted content is encrypted with a set of frame keys;

receiving, using the device processor, an encrypted copy of the set of frame keys, wherein the encrypted copy of the set of frame keys is encrypted with a content key;

receiving, using the device processor, an encrypted copy of the content key, wherein the encrypted copy of the content key has been encrypted using the user key of the cryptographic data;

recovering the device protection key using the device processor and the additional device match data;

decrypting the encrypted cryptographic data that is stored in the non-volatile device memory using the device processor and the recovered device protection key;

decrypting, using the device processor, the encrypted copy of the content key using the user key;

decrypting, using the device processor, the encrypted copy of the set of frame keys using the decrypted copy of the content key;

the piece of encrypted content using the device processor and the decrypted copy of the set of frame keys; and playing back the portion of the piece of decrypted content using the device processor.

2. The method of claim 1, wherein the combination of device characteristics is different for different categories of devices.

3. The method of claim 1, wherein generating device match data based upon the collected combination of device characteristics using the device processor comprises generating device match data using at least one cryptographic hash function to produce device match data having a predetermined length.

4. The method of claim 1, wherein the cryptographic data is associated with the user account.

5. The method of claim 1, wherein registering the device with a registration server further comprises the device sending product provisioning characteristics to the registration server.

6. The method of claim 1, wherein the registration server generates the device protection key using the device match data, and encrypts the cryptographic data using the device protection key.

7. The method of claim 1, wherein the cryptographic data further comprises at least one SSL certificate.

8. The method of claim 1, wherein encrypting the cryptographic data using the device protection key further comprises encrypting the cryptographic data using a provisioned encryption key and encrypting the provisioned encryption key using the device protection key.

9. The method of claim 1, wherein securing cryptographic data on the device is performed prior to playing back the portion of a piece of encrypted content.

10. The method of claim 9, wherein recovering the device protection key using the device processor further comprises:

collecting the combination of device characteristics that uniquely identify the device using information stored on the device and accessible to the device using the device processor;

generating device match data based upon the collected combination of device characteristics using the device processor; and generating a device protection key using the device processor and the device match data.

11. The method of claim 1, further comprising validating the identity of the device.

12. The method of claim 11, wherein validating the identity of the device comprises:

collecting the combination of device characteristics that uniquely identify the device using information stored on the device and accessible to the device using the device processor;

generating device match data by applying a cryptographic hash function to the collected combination of device characteristics using the device processor; and comparing the generated device match data to stored device match data associated with the device.

13. The method of claim 12, wherein comparing the generated device match data to stored device match data associated with the device further comprises generating a token using the generated device match data and comparing the token to a stored token.

14. The method of claim 12, wherein a server compares the generated device match data to stored device match associated with the device.

15. The method of claim 12, wherein the device processor compares the generated device match data to stored device match data.

16. A device, comprising:

a processor;

a volatile device memory a non-volatile device memory storing a client application;

wherein the client application directs the processor to:

(i) receive cryptographic data from a registration server using the device processor;

(ii) secure the cryptographic data in the non-volatile device memory, wherein to secure the cryptographic data in the non-volatile device memory the application directs the processor to:

collect a combination of device characteristics that uniquely identify a device using information stored on the device and accessible to the processor;

generate device match data based upon the collected combination of device characteristics;

register the device with the registration server by sending the generated device match data to the registration server in order for the registration server to associate the device match data with the user account;

hash the generated device match data and storing the hashed value in non-volatile memory;

generate a device protection key using the device match data and store the generated device protection key in the volatile device memory;

encrypt the cryptographic data using the generated device protection key, wherein the encrypted cryptographic data comprises at least an identifier of a user account and a user key; and store the encrypted cryptographic data in the non-volatile device memory;

(iii) upon receiving an attempt to access a protected function, wherein to verify device match data on the device the application directs the processor to:

re-collect the combination of device characteristics that uniquely identify the device using information stored on the device and accessible to the device;

generate additional device match data based upon the re-collected combination of device characteristics;

hash the additional device match data to generate verification hash value;

compare the verification hash value to the stored hash value in the nonvolatile memory;

when the comparison indicates a match, allow access to the protected function; and when the comparison indicates a mismatch, reset the non-volatile memory on the device, thereby deleting encrypted cryptographic data stored in the non-volatile memory on the device;

and (iv) play back a portion of a piece of encrypted content on the device, wherein to play back the portion of protected content the application directs the processor to:

receive a piece of encrypted content, wherein the piece of encrypted content is encrypted with a set of frame keys;

receive an encrypted copy of the set of frame keys, wherein the encrypted copy of the set of frame keys is encrypted with a content key;

receive an encrypted copy of the content key, wherein the encrypted copy of the content key has been encrypted using the user key of the cryptographic data;

recover the device protection key using the additional device match data;

decrypt the encrypted cryptographic data that is stored in the non-volatile device memory using the recovered device protection key;

decrypt the encrypted copy of the content key using the user key;

decrypt the encrypted copy of the set of frame keys using the decrypted copy of the content key;

decrypt the piece of encrypted content using the decrypted copy of the set of frame keys; and playing back the portion of the piece of decrypted content using the device processor.

17. The device of claim 16, wherein the combination of device characteristics is different to the combination of device characteristics utilized to generate device match data on another category of device.

18. The device of claim 17, wherein the client application directs the processor to generate device match data based upon the collected combination of device characteristics using at least one cryptographic hash function that produces device match data having a predetermined length.

19. The device of claim 16, wherein registering the device with a registration server further comprises the client application directing the processor to send product provisioning characteristics to the registration server.

20. The device of claim 16, wherein the client application directing the processor to encrypt the cryptographic data using the device protection key further comprises the client application directing the processor to encrypt the cryptographic data using a provisioned encryption key and encrypting the provisioned encryption key using the device protection key.

21. The device of claim 16, wherein the cryptographic data further comprises at least one SSL certificate.

22. The device of claim 21, wherein the client application directing the processor to recover the device protection key using the generated device match data further comprises the client application directing the processor to:

collect the combination of device characteristics that uniquely identify the device using information stored on the device and accessible to the device;

generate device match data based upon the collected combination of device characteristics; and generate a device protection key using the device match data.

23. The device of claim 16, wherein the client application further directs the processor to validate the identity of the device.

24. The device of claim 23, wherein the client application directing the processor to validate the identity of the device further comprises the client application directing the processor to:

collect the combination of device characteristics that uniquely identify the device using information stored on the device and accessible to the device;

generate device match data by applying a cryptographic hash function to the collected combination of device characteristics; and compare the generated device match data to stored device match data associated with the device.

25. The device of claim 24, wherein the client application directing the processor to compare the generated device match data to stored device match data associated with the device further comprises the client application directing the processor to generate a token using the generated device match data and comparing the token to a stored token.

26. A non-transitory machine readable medium containing processor instructions, where execution of the instructions by a processor of a device comprising a volatile device memory and a non-volatile device memory causes the processor to perform a process comprising:

(i) receiving cryptographic data from a registration server using the device processor;

(ii) securing the cryptographic data on the device, wherein securing the cryptographic data on the device comprises:

collecting a combination of device characteristics that uniquely identify the device using information stored on the device and accessible to the device;

generating device match data based upon the collected combination of device characteristics;

registering the device with the registration server by sending the generated device match data to the registration server in order for the registration server to associate the device match data with the user account;

hashing the generated device match data and storing the hashed value in non-volatile memory;

generating a device protection key using the device match data and storing the generated device protection key in the volatile device memory;

encrypting the cryptographic data using the generated device protection key, wherein the encrypted cryptographic data comprises at least an identifier of a user account and a user key; and storing the encrypted cryptographic data in non-volatile device memory;

(iii) upon receiving an attempt to access a protected function, verifying device match data on the device, wherein verifying device match data on the device comprises:

re-collecting the combination of device characteristics that uniquely identify the device using information stored on the device and accessible to the device;

generating additional device match data based upon the re-collected combination of device characteristics;

hashing the additional device match data to generate verification hash value;

comparing the verification hash value to the stored hash value in the non-volatile memory;

when the comparison indicates a match, allowing access to the protected function; and when the comparison indicates a mismatch, resetting the non-volatile memory on the device, thereby deleting encrypted cryptographic data stored in the nonvolatile memory on the device;

and (iv) playing back a portion of a piece of encrypted content on the device, wherein playing back the portion of protected content comprises:

receiving a piece of encrypted, wherein the piece of encrypted content is encrypted with a set of frame keys;

receiving an encrypted copy of the set of frame keys, wherein the encrypted copy of the set of frame keys is encrypted with a content key;

receiving an encrypted copy of the content key, wherein the encrypted copy of the content key has been encrypted using the user key of the cryptographic data;

recovering the device protection key using the additional device match data;

decrypting the encrypted cryptographic data that is stored in the non-volatile device memory the recovered device protection key;

decrypting the encrypted copy of the content key using the user key;

decrypting the encrypted copy of the set of frame keys using the decrypted copy of the content key;

decrypting the piece of encrypted content using the decrypted copy of the set of frame keys; and playing back the portion of the piece of decrypted content.

* * * * *